(No Model.)
J. N. CAMP.
MUSIC LEAF TURNER.
No. 485,255. Patented Nov. 1, 1892.
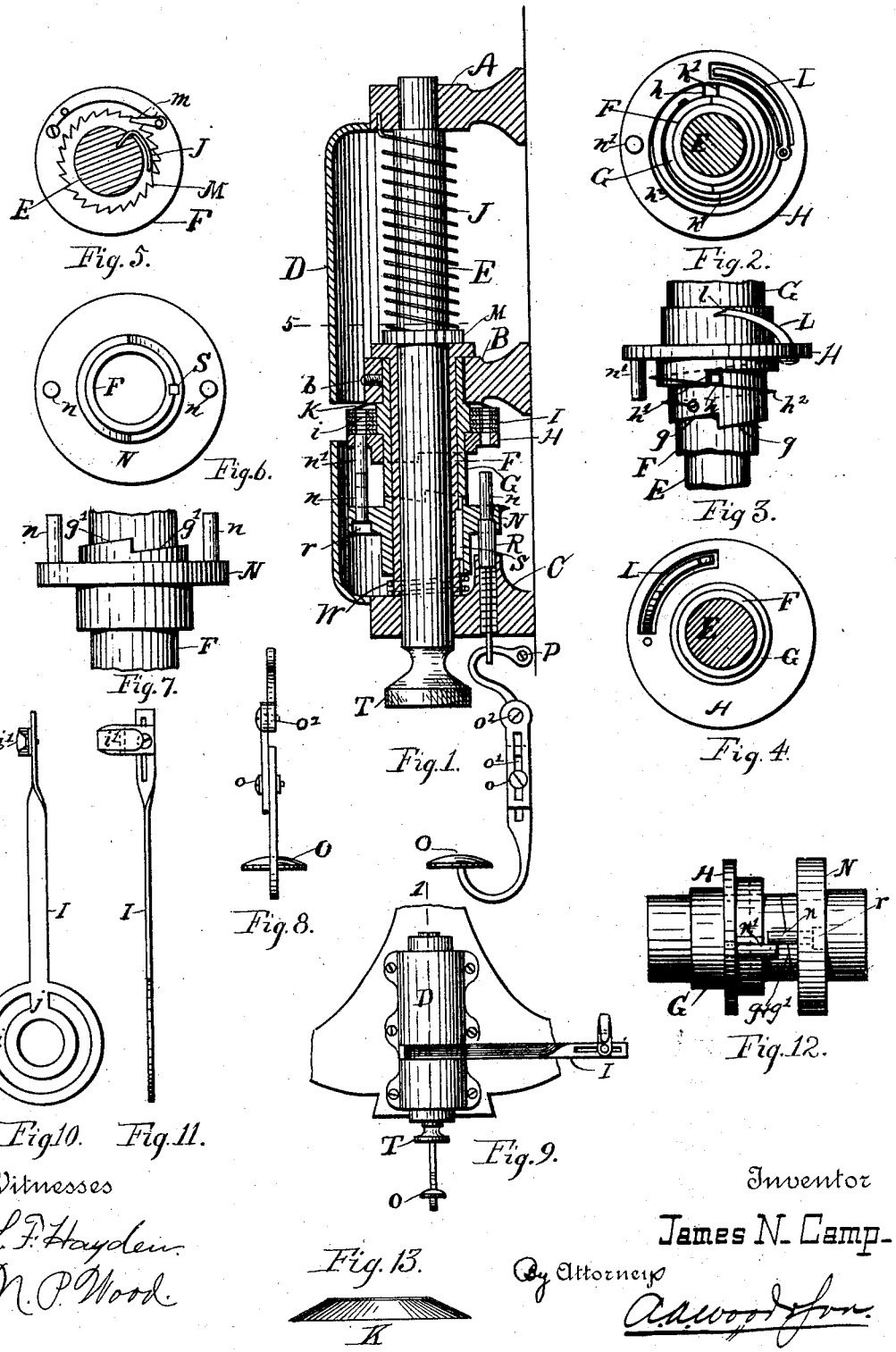
Witnesses
L. F. Hayden.
N. P. Wood.
Inventor
James N. Camp
By Attorney

UNITED STATES PATENT OFFICE.

JAMES N. CAMP, OF ATLANTA, GEORGIA.

MUSIC-LEAF TURNER.

SPECIFICATION forming part of Letters Patent No. 485,255, dated November 1, 1892.

Application filed March 19, 1891. Serial No. 385,670. (No model.)

*To all whom it may concern:*

Be it known that I, JAMES N. CAMP, a citizen of the United States, and a resident of Atlanta, in the county of Fulton and State of Georgia, have invented certain new and useful Improvements in Music-Leaf Turners; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of this invention is to supply a device for turning leaves of music that shall be effective and convenient.

It consists of a shaft actuated by the torsional energy of a spiral spring and connected by proper mechanism to laterally-projecting arms that may be attached to the music-leaves, as will be hereinafter fully set forth, and the parts thought to be new pointed out in the claims.

In the drawings accompanying this specification the invention is shown in the following figures:

In Figure 1 is shown a central vertical section on the line 1, Fig. 9, showing the shaft, spiral spring, and most of the other details. In Fig. 2 is shown a bottom view of the disk on which the laterally-projecting arms rest and the spring on said disk that engages with the said arms and turns them, one at a time. This figure also shows the sleeve on which the disk has a semi-rotary motion, the spiral spring by which after turning an arm it is brought back to its original position, and the pin that stops the disk when so brought back. In Fig. 3 is shown an elevation of the disk and other parts shown in Fig. 2. In Fig. 4 is shown a top view of the parts shown in Figs. 2 and 3. In Fig. 5 is shown a section through the shaft on the line 5, Fig. 1. In Fig. 6 is shown a top view of a disk on a sleeve and the spline by which they are caused to revolve together. In Fig. 7 is shown an elevation of the parts shown in Fig. 6. In Fig. 8 is shown an edge view of the operating-key that is also shown in Figs. 1 and 9. In Fig. 9 is shown a front elevation of the device. In Fig. 10 is shown the top of one of the arms to which the music-leaves are attached. In Fig. 11 is shown an edge view of the arm shown in Fig. 10. In Fig. 12 are shown the flanges shown in Figs. 3 and 7 and their relative positions. Fig. 13 is an enlarged view of the spring-washer.

In the several figures the different parts will be uniformly indicated by reference-characters.

A, B, and C, Fig. 1, are brackets that carry the operative parts and by which they are attached to the music-rack.

D is a cover or shield having an aperture through which the arms pass, as shown in Fig. 9.

Journaled in the brackets A and C is the shaft E. On the shaft E is the sleeve F, that turns freely thereon, as well as in the sleeve G, which is fastened to the bracket B by a set-screw. The stationary sleeve G has an enlarged central part, as shown in Fig. 1, forming a shoulder to abut against the bracket B and a shoulder against which the disk H abuts. The disk H is held in position against the shoulder on the sleeve G by a pin $h$, as shown in Figs. 2 and 3, shoulders $h'$ on opposite sides of the hub of the disk H preventing said disk H from making more than half a turn, for reasons that will be hereinafter explained.

The arms I, Figs. 1, 9, 10, and 11, inclose and turn on the enlarged part of the stationary sleeve G, being held between the disk H and the spring-washer K. The arms I have each an annular slot $i$, Figs. 1 and 10, that form nearly a complete circle, having a part $j$, with which the shoulder $l$ on the spring L, attached to the disk H, engages and turns the arm with said disk. The disk H has a semi-rotary motion, as will hereinafter be described, and takes one arm after another and turns it a half-revolution. It will be observed by reference to Figs. 2 and 4 that there is a recess in the disk H under the spring L, into which the said spring will be pressed by the arm I when assembled, as shown in Fig. 1, with the part $j$ resting on the forward projection in front of the shoulder $l$. The turning of the disk H by the spring J through connections to be hereinafter described will cause the shoulder $l$ on the spring L to carry with it the bottom arm I. The return of the disk H to its first position will cause the shoulder $l$ to pass under and then engage the second arm I and turn it as just described, which operation will be repeated with each back and forth semi-rotation of the disk H until all or the required number of arms I shall have been turned, when all will be returned to their original positions, which will again press the spring into the recess in the disk H, with the shoulder $l$ on the spring L in engagement with the part $i$ of the arm I. The disk H is brought back each turn by the spiral spring $h^2$ to the position shown in Figs. 2 and 3, which is the position in which the shoulder $l$ on the spring L will engage with the part $j$ on the arm I. The torsional coil-spring J is attached at one end, as shown in Fig. 1, to the bracket A, and at the other to the shaft E, as shown in Fig. 5. The ratchet M is attached to the shaft E and connects the shaft with the sleeve F by means of the spring-pressed pawl $m$. The disk N is splined on the sleeve F by the spline S, as shown in Figs. 1 and 6, and consequently revolves with it. Oppositely located on the disk N are the upwardly-projecting pins $n$, and at the same radial distance on the disk H is a downwardly-projecting pin $n'$. By reference to Figs. 1 and 2 it will be seen that the bottom end of the stationary sleeve G has two spiral faces $g$, each extending half-way around, that engage with correlative spiral faces $g'$ on the top of the disk N. The key O, having adjusting-screw $o$ passing through slots $o'$ and an adjustment by the joint and screw $o^2$, by means of which it may be made to hang at any angle, has a fulcrum P at its end and connects with the spring-actuated piston R. The piston R, entering one of the oppositely-disposed holes $r$ in the bottom of the disk N, as shown in Fig. 1, will prevent the turning of the shaft by the spring J, the consecutive connections between the disk and shaft being the spline S, the sleeve F, and the pawl $m$, engaging with the ratchet M on the shaft. It follows that if the piston R is withdrawn by means of the key O the torsional spring J will revolve the disk N and in so doing will turn, by means of the pins $n$ and $n'$, the disk H and one of the arms I, the movement of the disk H being stopped by the pin $h$ and by reason of the fact that the engaging spiral surfaces $g$ and $g'$ on the stationary sleeve G and the disk N will force the disk N down and release the engagement of the pins $n$ and $n'$. The spring W presses the disk N upwardly and the piston R holds it on its half-revolution by entering one of the two holes $r$ on opposite sides of the disk. After the release of the engagement of the pins $n$ and $n'$ the spiral spring $h^2$ will return the disk H to the position at which the shoulder $l$ on the spring L will engage with another arm I, in which position the pin $h$ will stop the disk H.

It is obviously necessary that the torsional spring J should be of sufficient length to give the shaft as many half-revolutions as there are arms to turn the music-leaves, each arm being attached to a leaf preferably by a spring-snap $i'$, said spring being wound up by means of a knurled wheel T.

Having thus described my invention, what I claim as new, and desire to secure by Letters Patent of the United States, is—

1. In a music-leaf turner, the arms I, each having on its free end a snap to engage a music-leaf and having an annular slot $i$ in the other end, and the semi-revolving disk H, carrying the spring L, projecting into the said annular slots in the arms and having a shoulder $l$, for the purpose described.

2. In a music-leaf turner, the disk H, having automatic connection with a series of arms attached to the music-leaves and shoulders $h'$, and the pin $h$ in the stationary sleeve G for the purpose of limiting the movement of said disk to one-half of a revolution.

3. In a music-leaf turner, a disk journaled on the stationary sleeve G and having automatic connection with a series of arms connected to leaves of music and carried by the downwardly-projecting pin $n'$, the disk N, the spiral faces $g$ and $g'$ on the sleeve and disk, respectively, the upwardly-projecting pins $n$, the holes $r$, the spring-pressed plunger R, connected to a key, and the spring W, substantially as shown and described, and for the purpose specified.

4. In a music-leaf turner, the disk H, having automatic connection with a series of arms connected to leaves of music and carrying downwardly-projecting pin $n'$, the disk N, carrying upwardly-projecting pins $n$ and connected with the sleeve F by the spline S, the ratchet connection with the shaft E, and the spring J.

In testimony whereof I hereunto affix my signature in presence of two witnesses.

JAMES N. CAMP.

Witnesses:
A. P. WOOD,
ALBERT A. WOOD.